Figure 1:
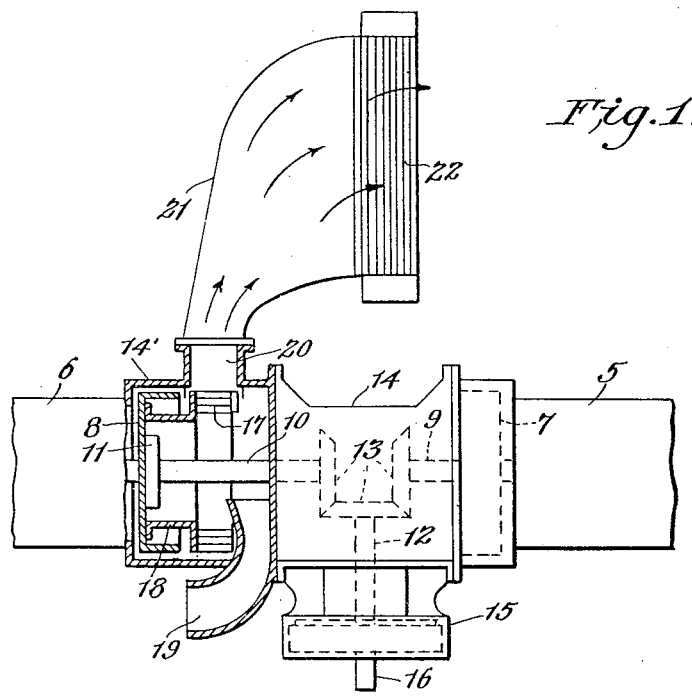

May 20, 1941.   A. M. WOLF   2,242,495
ACCESSORY FOR MOTOR VEHICLE POWER PLANTS
Original Filed April 9, 1936

INVENTOR.
Austin M. Wolf,
BY
M. C. Lyddane
ATTORNEY.

Patented May 20, 1941

2,242,495

UNITED STATES PATENT OFFICE 2,242,495

ACCESSORY FOR MOTOR VEHICLE POWER PLANTS

Austin M. Wolf, Plainfield, N. J.

Original application April 9, 1936, Serial No. 73,584, now Patent No. 2,185,165, dated December 26, 1939. Divided and this application November 30, 1939, Serial No. 306,845

5 Claims. (Cl. 123—171)

This invention relates to accessories for motor vehicle power plants, the subject matter of the present application constituting a division of my pending application for Patent Ser. No. 73,584 filed April 9, 1936, now Patent No. 2,185,165, Dec. 26, 1939, which in turn is a continuation of my original application Ser. No. 612,057 filed May 18, 1932.

It is the general object and purpose of my present invention to provide a simple, compact and efficiently operating arrangement of the accessory and power transfer unit in successive axial relation with the engine crank shaft and a unitary housing structure for the power transfer mechanism and accessory directly fixed to one end of the engine.

It is another object of the invention, in one embodiment thereof to provide, in combination with laterally spaced engines, power transfer mechanism and an accessory, such as the fan blower of the cooling system having a driving connection with the power input shaft, and housing means for the transfer mechanism and fan blower rigidly joined to the opposed ends of the spaced engines.

A further object of the invention is to provide an arrangement of the fan blower in combination with either single or multiple engines for drawing air through an intake passage in heat transfer relation to the radiator of the water cooling system and discharging the heated air in variable proportions to the interior of the motor vehicle body and to the atmosphere.

With the above and other objects in view, the invention consists in the improved accessory for motor vehicle power plants and in the form, construction and relative arrangement of its several parts as will hereinafter be more fully described, illustrated in the accompanying drawing and subsequently incorporated in the subjoined claims.

Figure 2:
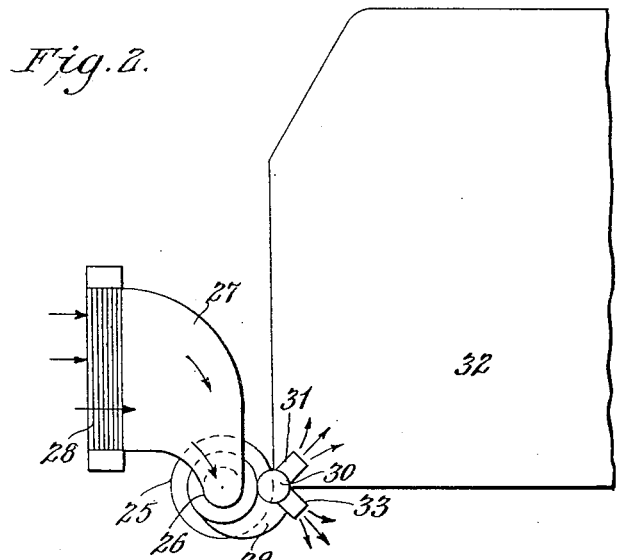

In the drawing wherein I have shown several simple and practical embodiments of the invention and in which similar reference characters designate corresponding parts throughout the several views:

Fig. 1 is a top plan view partly in section illustrating one arrangement of the accessory in combination with laterally spaced apart engines and power transfer mechanism and Fig. 2 is a side elevation showing an arrangement of the fan blower for the purpose of discharging heated air drawn through the radiator of the cooling system into the body of the vehicle.

Referring in detail to the drawing, and for the present, more particularly to Fig. 1 thereof, 5 and 6 designate two internal combustion engines, laterally spaced apart. The opposed ends of the engine crank shafts are provided with suitable fly-wheels 7 and 8 respectively.

Power input shafts 9 and 10 are adapted to be connected at one of their ends with the respective engine crank shafts by suitable couplings, one of which is indicated at 11. Power is transferred from said input shaft to the power take-off shaft 12 through suitable transfer gearing 13.

The power transfer mechanism and the fly-wheels 7 and 8 are enclosed within a unitary housing structure generally indicated at 14 which includes a fan blower casing section 14' and a laterally offset housing section 15 for a suitable clutch connecting the power take-off shaft 12 with the transmission shaft 16 through which the power is conveyed to a suitable change speed gearing (not shown).

In the present instance I have shown a Sirocco type fan blower within the casing or housing section 14', comprising the impeller vanes or buckets 17 which are suitably mounted in spaced circumferential succession upon one end of the tubular member 18 which is securely fixed at its other end to the engine fly-wheel 8. In the rotation of the blower air is drawn into casing 14' through the inlet 19 and delivered or discharged therefrom through the outlet 20 to the duct or passage 21 from which it is finally discharged through the radiator 22 of the cooling system for the engines 5 and 6.

It will be seen from the above description that the present invention provides a compact operative relationship between the power transfer mechanism and the fan blower or other accessory in co-axial relation with the engine crank shafts, said transfer mechanism and accessory being operatively mounted in a unitary housing structure which is rigidly secured to and supported by the spaced engines 5 and 6. It will, however, be understood that if desired, the above described mounting and arrangement of the fan blower or other accessory may be employed in connection with a single engine. Obviously, the engine 5 may be omitted, in which case the fan blower and power transfer gearing 13 will be contained in a unitary housing structure fixed to the end of the engine 6 and in longitudinal succession with the engine crank shaft.

In Fig. 2 of the drawing, I show a modified arrangement, in which single or multiple engines are mounted at the front or rear end of the vehicle, as fully disclosed in my original application, above identified. As shown, the blower casing 25 has its inlet 26 connected with a duct or passage 27, through which air is drawn inwardly through the radiator 28 of the engine cooling system, and is discharged by the blower through the outlet duct 29. The discharge of the heated air from this duct is controlled by a suitable valve 30 so that the air may be discharged either through the outlet 31 into the passenger compartment of the vehicle body 32, or it may be discharged to the outer atmosphere through the outlet 33. A desired predetermined temperature may be maintained within the passenger compartment by properly adjusting the valve 30 so as to proportionally distribute the heated air to said compartment and to the outer atmosphere. Such valve adjustment may be made either by a suitable manually operable means, or automatically, by a thermostatically controlled means. Thus I combine in a single unit and in direct operative relationship with the motor vehicle engine, means for cooling the water supplied to the engine cylinder jackets and means for properly heating the passenger compartment of the vehicle.

From the foregoing description considered in connection with the accompanying drawing, the construction, manner of operation and several advantages of the present invention will be clearly understood. It will be appreciated that I have devised a very simple, compact and efficiently operating arrangement of the blower or other accessory in combination with the power transfer means and in direct driving relation with the engine crank shaft. Thus I am enabled to utilize a unitary housing structure for both the power transfer mechanism and the fan blower. By the elimination of a driving belt or other operating connection between the blower and the engine crank shaft expense incident thereto is obviated and more efficient and reliable operation obtained.

While I have herein shown and described several practical embodiments of the present invention, it is to be understood that the combination and relative arrangement of the various mechanical parts is susceptible to more or less modification. Accordingly, my invention is not to be limited in these particulars, since it may also be exemplified in various other alternative structural forms, not herein specifically disclosed, but which may be fairly comprehended as within the spirit and scope of the appended claims.

I claim:

1. In combination, an internal combustion engine, a fly-wheel at one end of the engine crank shaft, power transfer mechanism beyond the fly-wheel including a power input shaft coupled to said fly-wheel, an accessory unit having a separate driving connection with said fly-wheel, and a unitary housing structure for said fly-wheel, accessory unit and power transfer mechanism directly fixed to the engine.

2. In combination, laterally spaced apart internal combustion engines having aligned crank shafts, a co-axially related accessory unit and power transfer gearing in immediate adjacency between said engines and having driving connections with the engine crank shafts, and a unitary housing structure for said accessory unit and power transfer gearing rigidly joined to the opposed ends of said engines.

3. In combination, a pair of internal combustion engines disposed in spaced apart end to end relation, power transfer gearing between said engines having a driving connection with the crank shaft of one of said engines, an accessory unit between said gearing and the other engine, and individual drive means connecting the accessory unit and the transfer gearing respectively with the crank shaft of the latter engine.

4. In combination, an internal combustion engine, a fly-wheel at one end of the engine crank shaft, power transfer mechanism and a drive coupling between the same and said crank shaft, an accessory unit having an independent direct driving connection with said fly-wheel, and a unitary housing structure for said fly-wheel, accessory unit and power transfer mechanism.

5. In combination, an internal combustion engine, a fly-wheel at one end of the engine crank shaft, power transfer mechanism beyond the fly-wheel having a driving connection with said crank shaft, an accessory unit having a driven member interposed between said transfer mechanism and the fly-wheel and directly fixed to the latter, and a unitary housing structure for said accessory unit and fly-wheel mounted on the engine.

AUSTIN M. WOLF.